(12) United States Patent
Vielmo

(10) Patent No.: US 9,982,801 B2
(45) Date of Patent: May 29, 2018

(54) DEVICE AND METHOD FOR BURYING A CONDUIT IN THE BED OF A BODY OF WATER

(71) Applicant: SAIPEM S.p.A., San Donato Milanese (IT)

(72) Inventor: Paolo Vielmo, Domegge di Cadore (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days. days.

(21) Appl. No.: 14/767,863

(22) PCT Filed: Feb. 20, 2014

(86) PCT No.: PCT/IB2014/059139
§ 371 (c)(1),
(2) Date: Aug. 13, 2015

(87) PCT Pub. No.: WO2014/128651
PCT Pub. Date: Aug. 28, 2014

(65) Prior Publication Data
US 2016/0003373 A1    Jan. 7, 2016

(30) Foreign Application Priority Data
Feb. 20, 2013    (IT) .............................. MI2013A0237

(51) Int. Cl.
*F16L 1/16*    (2006.01)
*E02F 5/00*    (2006.01)
(Continued)

(52) U.S. Cl.
CPC .............. *F16L 1/161* (2013.01); *B63B 35/03* (2013.01); *B63H 19/08* (2013.01); *E02F 3/8866* (2013.01);
(Continued)

(58) Field of Classification Search
CPC ....... B63B 35/03; B63H 19/08; E02F 3/8866; E02F 5/006; E02F 5/105; E02F 5/109;
(Continued)

(56) References Cited

U.S. PATENT DOCUMENTS 3,235,982 A * 2/1966 Krohn ...................... E02F 5/10
37/347
3,267,682 A * 8/1966 Robley ................... F16L 1/161
405/170
(Continued)

FOREIGN PATENT DOCUMENTS

EP    0 006 812    1/1980
FR    2 624 533    6/1989
GB    2 343 493    5/2000

OTHER PUBLICATIONS

International Search Report and Written Opinion for International Application No. PCT/IB2014/059139 dated Jul. 21, 2014.
(Continued)

*Primary Examiner* — Benjamin F Fiorello
(74) *Attorney, Agent, or Firm* — Neal, Gerber & Eisenberg LLP

(57) ABSTRACT

A device configured to bury a conduit in the bed of a body of water has a digging module configured to dig a trench in the bed of the body of water; a manipulating module configured to feed conduit sections into the trench; and a push module configured to join the conduit sections inside the trench and move the device in a travelling direction.

23 Claims, 5 Drawing Sheets

(51) Int. Cl.
 B63B 35/03 (2006.01)
 E02F 3/88 (2006.01)
 E02F 5/10 (2006.01)
 F16L 1/12 (2006.01)
 F16L 1/20 (2006.01)
 B63H 19/08 (2006.01)
 F16L 1/235 (2006.01)
(52) U.S. Cl.
 CPC .............. *E02F 5/006* (2013.01); *E02F 5/105* (2013.01); *E02F 5/109* (2013.01); *F16L 1/123* (2013.01); *F16L 1/20* (2013.01); *F16L 1/235* (2013.01)
(58) Field of Classification Search
 CPC ... F16L 1/123; F16L 1/161; F16L 1/20; F16L 1/235
 See application file for complete search history.

(56) References Cited

U.S. PATENT DOCUMENTS

| | | | |
|---|---|---|---|
| 3,292,379 A * | 12/1966 | McElvany | E02F 5/10 405/179 |
| 3,381,478 A * | 5/1968 | Wells | E02F 5/06 254/29 R |
| 3,393,524 A | 7/1968 | Terrell | |
| 3,520,358 A | 7/1970 | Brooks et al. | |
| 3,636,715 A * | 1/1972 | Morner | E02D 29/05 405/132 |
| 3,831,388 A | 8/1974 | Wells | |
| 3,906,737 A * | 9/1975 | Brown | F16L 1/036 104/307 |
| 4,343,573 A | 8/1982 | Breitfuss | |
| 4,345,854 A * | 8/1982 | Valantin | B63B 35/03 405/155 |
| 4,647,256 A * | 3/1987 | Hahn | E21D 9/005 138/155 |
| 6,280,119 B1 * | 8/2001 | Ryan | B66C 1/425 294/104 |
| 2011/0305528 A1 * | 12/2011 | Riggle, Jr. | E02D 17/086 405/283 |

OTHER PUBLICATIONS

Notification Concerning Submission, Obtention or Transmittal of Priority document for International Application No. PCT/IB2014/059139 dated May 16, 2014.

* cited by examiner

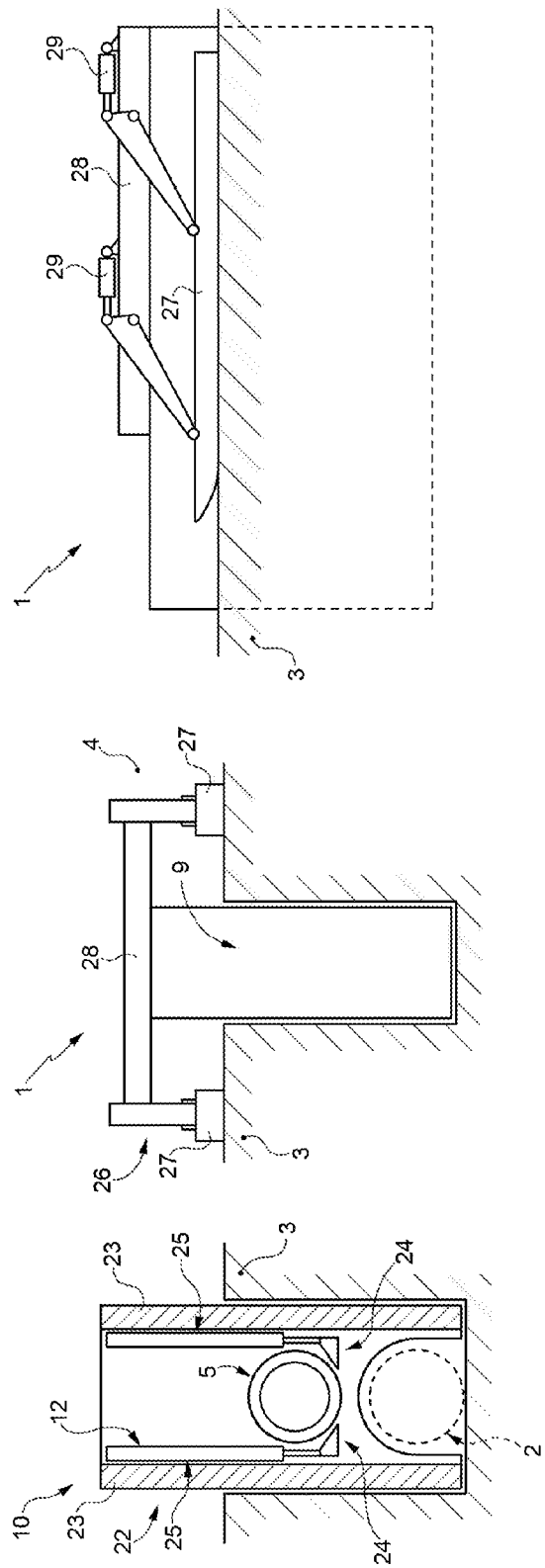

DEVICE AND METHOD FOR BURYING A CONDUIT IN THE BED OF A BODY OF WATER

PRIORITY CLAIM

This application is a national stage application of PCT/IB2014/059139, filed on Feb. 20, 2014, which claims the benefit of and priority to Italian Patent Application No. MI2013A000237, filed on Feb. 20, 2013, the entire contents of which are each incorporated by reference herein.

BACKGROUND

Continuous elongated members at least partially housed within buried conduit are normally laid on the bed of a body of water to form underwater gas or power lines, which must be protected close to landing docks or in shallow water. In shallow water, it is therefore common practice to bury such members in the bed of the body of water.

For protection in shallow water, continuous elongated members are normally buried directly in a trench dug into the bed of the body of water. Known techniques of doing this are known as pre-trenching and post-trenching. Pre-trenching consists in digging a trench; laying the continuous elongated member inside the trench; and backfilling the trench to bury the continuous elongated member. Post-trenching consists in laying the continuous elongated member on the bed of the body of water; digging a trench in the bed of the body of water underneath the continuous elongated member, so the latter sinks into the trench; and backfilling the trench to bury the continuous elongated member. Since the trench tends to eventually fill up on its own (natural backfilling), the backfilling and burying steps may be omitted.

Drawbacks common to both the above techniques of burying continuous elongated members are the enormous amount of energy required to excavate large masses of the bed of the body of water, and slow trench digging speed.

Pre-trenching has the drawback of requiring a widely flared trench, to prevent the trench from backfilling naturally, by the lateral faces of the trench caving in, before the continuous elongated member is laid. The time lapse between digging the trench and laying the continuous elongated member may be relatively considerable.

Post-trenching poses a similar problem, though to a lesser degree, by having less flared trench walls, and by having to prevent the trench from backfilling before the member reaches the required depth. The length of the open trench may extend to hundreds of meters.

Moreover, both the above techniques call for two separates passes along the burial route: one pass to lay the member, and one to dig the trench.

Certain of the above drawbacks encountered in burying continuous elongated members also apply to burying conduits.

SUMMARY

The present disclosure relates to a device configured to bury a conduit in the bed of a body of water.

The buried conduit serves to at least partly house a continuous elongated member, such as a pipeline, cable, umbilical, or bundle of pipelines and/or cables, at a landing dock or in relatively shallow water.

It is an advantage of the present disclosure to provide a device configured to bury a conduit in the bed of a body of water, configured to eliminate certain of the drawbacks of certain of the known art.

According to the present disclosure, there is provided a device configured to bury a conduit in the bed of a body of water, the device comprising a digging module configured to dig a trench in the bed of the body of water; a manipulating module configured to feed conduit sections into the trench; and a push module configured to join the conduit sections inside the trench and simultaneously move the device in a travelling direction.

In the present disclosure, the trench is dug and the conduit formed in one pass along the set route in the bed of the body of water. Moreover, the movement used to assemble the conduit sections also provides thrust to move the whole device forward.

In certain embodiments, the digging module, the push module and the manipulating module are arranged successively in the opposite direction to the travelling direction.

In certain embodiments of the present disclosure, the digging module is configured to break up and remove a mass of the bed of the body of water having a designated or given cross section substantially the same size as the cross section of the entrenched part of the push module and manipulating module. This way, the cross section of the trench can be minimized.

In certain embodiments of the present disclosure, the manipulating module comprises a manipulator configured to grip a conduit section and align the conduit section with a designated or given reference. This enables the conduit sections to be joined to one another.

In certain embodiments of the present disclosure, the manipulating module comprises a first frame, in turn comprising two first lateral walls configured to support the side faces of the trench. This makes it possible to dig a trench with substantially vertical side faces, and define a space in which to feed and assemble the conduit sections.

In certain embodiments, the lateral walls of the manipulating module serve to support the manipulator.

In certain embodiments of the present disclosure, the push module comprises a second frame; and a pusher, which is fitted to the second frame and configured to engage a conduit section and push the conduit section, in the opposite direction to the travelling direction, against a member outside the device, so as to fit the conduit section tightly to the outside member and move the device in the travelling direction. This way, the conduit section can be fitted tightly and the device moved using only one pusher.

In certain embodiments, the longitudinal tilt of the pusher is selectively adjustable, such as by a first actuator connected to the second frame and the pusher. This enables the pusher to engage the conduit section when the two are misaligned.

In certain embodiments, the second frame comprises two second lateral walls configured to support the side faces of the trench.

In certain embodiments, the manipulating module and push module are connected rigidly to each other.

In certain embodiments of the present disclosure, the digging module and push module are articulated about a steering axis. This enables the device to be steered horizontally.

In certain embodiments, the device comprises at least one second actuator configured to control the position of the digging module, with respect to the push module, about the steering axis. This enables control of the steering angle.

In certain embodiments of the present disclosure, the digging module is connected to the push module in selectively adjustable manner in a substantially vertical direction using at least one third actuator. This enables adjustment of the depth and longitudinal tilt of the device.

In certain embodiments of the present disclosure, the device comprises movable lateral walls located on opposite sides and which can be operated selectively to adjust the pressure of each against the side face of the trench. This enables adjustment of the lateral tilt of the device.

In another embodiment of the present disclosure, the device comprises a stabilizer configured to rest adjustably on the bed of the body of water. In certain such embodiments, the stabilizer comprising a frame connected rigidly to the push module or manipulating module, and two supports located on opposite sides of the push module and connected to the frame in selectively movable manner independently of each other. The stabilizer provides for both supporting the push module and manipulating module, and controlling the lateral tilt of the device.

In certain embodiments of the present disclosure, the device comprises a backfill module. In certain such embodiments, the backfill modules comprising a shovel, which extends on opposite sides of the trench and comprises two blades sloping with respect to the travelling direction. In a variation of the present disclosure, the backfill module comprises screws or high-density fluid pumps configured to perform the backfill step right after the digging step. This way, the device provides for backfilling the trench faster over the conduit.

Another advantage of the present disclosure is to provide a method of burying a conduit in the bed of a body of water.

According to the present disclosure, there is provided a method of burying a conduit in the bed of a body of water, the method comprising the steps of digging a trench in the bed of the body of water using a device; feeding conduit sections into the trench; joining the conduit sections inside the trench and the device; and moving the device in a travelling direction. This way, the trench is dug and the conduit assembled and laid in one pass.

In certain embodiments, the method provides for pushing and joining the conduit section using a pusher, and using the pusher to move the device.

The thrust exerted by the pusher exerts pressure on the conduit section to fit the conduit sections tightly one inside the other and move the device. It should be appreciated that this configuration has a synergic effect.

In certain embodiments, each conduit section comprises a first and second end configured to form a relatively tight spigot and socket joint. This configuration simplifies assembly of the conduit.

In certain embodiments of the present disclosure, the device is articulated about a steering axis; the method comprising the step of acquiring a signal related to the steering angle. This way, steering and the path of the device can be monitored.

In certain embodiments of the present disclosure, the device is articulated so that one portion of the device is located at a different depth from another portion of the device; the method comprising acquiring a signal related to the variation in the depth of the two portions of the device. This makes it possible to control variations in entrenchment of the device.

In certain embodiments, the method comprises acquiring a signal related to the depth of the device, so as to precisely indicate entrenchment of the device and trench depth.

In certain embodiments, the method comprises acquiring a signal related to the longitudinal tilt of the device. This makes it possible to monitor travel of the device along a designated or given route.

In certain embodiments, the method comprises acquiring a signal related to the lateral tilt of the device. This signal indicates any lateral tilting of the device, so appropriate corrective action can be taken.

In certain embodiments, the method comprises acquiring a signal related to the longitudinal tilt of the pusher. This way, the pusher can be adjusted for easy connection to the conduit section.

In certain embodiments, the method comprises acquiring a signal related to the position of the conduit section with respect to a reference point. This signal simplifies connection between the conduit section and the previously laid conduit portion, on one side, and between the pusher and the conduit section, on the other.

The disclosure may be used to advantage as an alternative to microtunneling for laying guide pipes, and directional drilling. The disclosure also permits laying of pipelines of infinite length, by virtue of the pipe sections being added to the leading end, as opposed to the trailing end, of the laid pipeline.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the attached drawings, in which:

FIG. 14 shows a partly sectioned elevation, with parts removed for clarity, of the manipulating module of the device according to the present disclosure;

FIG. 15 shows an elevation, with parts removed for clarity, of the stabilizing system of the device according to the present disclosure;

FIG. 16 shows a side view, with parts removed for clarity, of the FIG. 15 stabilizing system;

DETAILED DESCRIPTION

Figure 1:
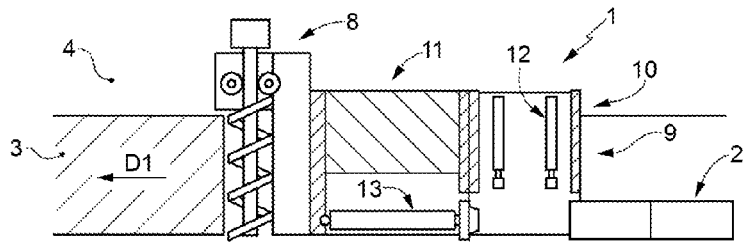
FIGS. 1, 2, 3, 4, 5 and 6 show schematic, partly sectioned side views, with parts removed for clarity, of a device configured to bury a conduit in the bed of a body of water, and at various stages in assembling a conduit section.

Referring now to the example embodiments of the present disclosure illustrated in FIGS. 1 to 19, number 1 in FIG. 1 indicates as a whole a device configured to bury a conduit 2 in the bed 3 of a body of water 4.

Figure 7:
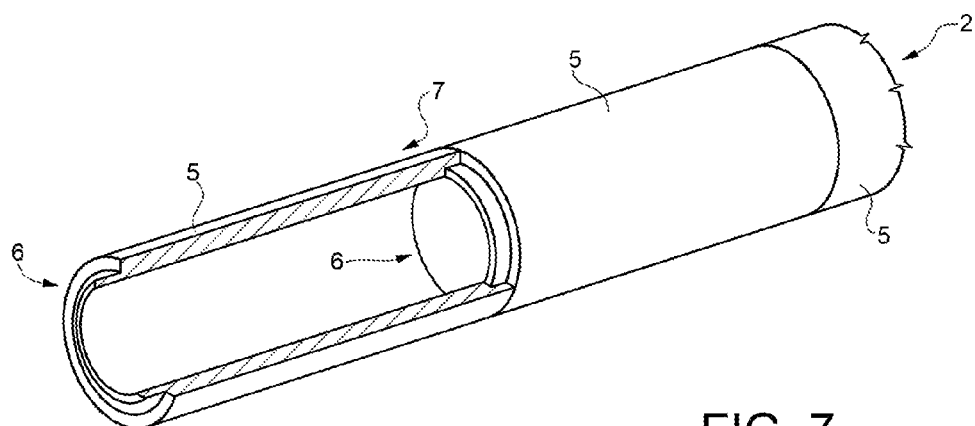
FIG. 7 shows a partly sectioned view in perspective, with parts removed for clarity, of a detail of the conduit.

As shown more clearly in FIG. 7, conduit 2 comprises a plurality of joined sections 5, which may be made of concrete or metal, and each of which has two opposite ends 6 and 7 configured to form relatively tight spigot and socket joints with the other sections 5.

As shown in FIG. 1, device 1 comprises a digging module 8 configured to dig a trench 9 in bed 3 of body of water 4; a manipulating module 10 configured to feed conduit sections 5 (FIG. 2) into trench 9; and a push module 11 configured to join conduit sections 5 to one another inside trench 9 and simultaneously move device 1 in a travelling direction D1.

Digging module 8, push module 11 and manipulating module 10 of device 1 are arranged successively in the opposite direction to travelling direction D1. Digging module 8 is configured to break up and remove a mass of bed 3 of body of water 4 having a designated or given cross section substantially the same size as the cross section of the entrenched part of push module 11 and manipulating module 10.

Figure 2:
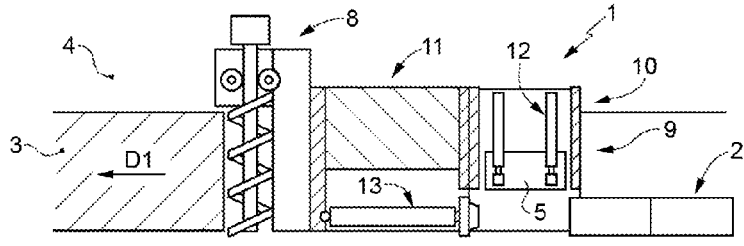

As shown in FIG. 2, manipulating module 10 comprises a manipulator 12 configured to grip a conduit section 5 and align the conduit section with a designated or given reference point.

Figure 3:
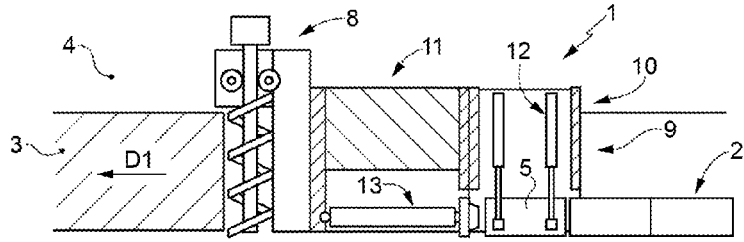

As shown in FIG. 3, conduit section 5 is aligned with the part of conduit 2 already laid inside trench 9.

Push module 11 comprises a pusher 13, which is adjustable to substantially align with the conduit section 5 supported by manipulator 12.

Figure 4:
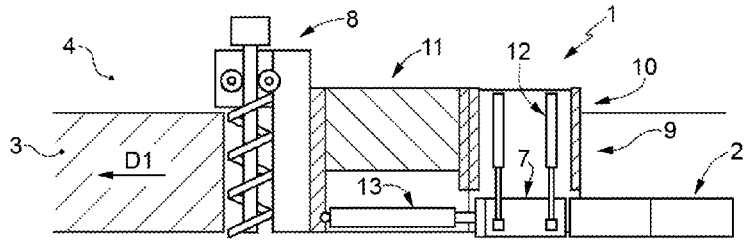

In FIG. 4, pusher 13 is extended, engages end 6 of conduit section 5, and pushes conduit section 5 to fit end 7 of conduit section 5 to end 6 of the laid portion of conduit 2.

Figure 5:
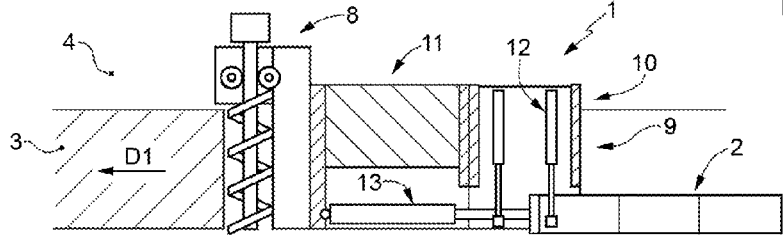
Figure 6:
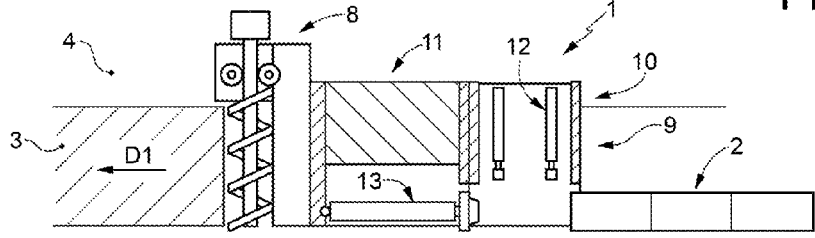

Further extension of pusher 13 moves the whole of device 1 in travelling direction D1, as shown in FIG. 5. On reaching its maximum extension, pusher 13 is withdrawn, and manipulator 12 is raised, as shown in FIG. 6. At this point, device 1 is ready to receive another conduit section 5, and the cycle of assembling conduit 2 and moving device 1 forward is repeated.

As device 1 moves forward, digging module 8 breaks up, excavates and removes a mass of bed 3 and deposits the mass of bed on opposite sides of trench 9.

Figure 9:
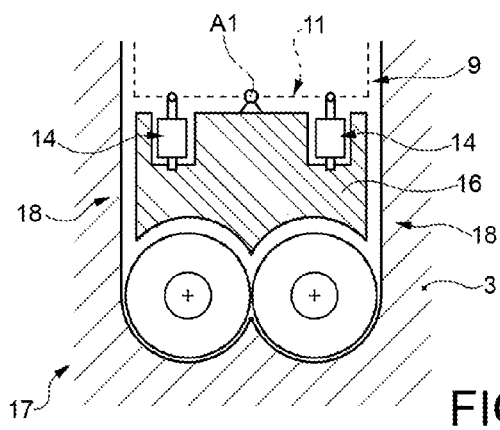
FIG. 9 shows a section, with parts removed for clarity, of the digging module along line IX-IX in FIG. 8.

With reference to FIG. 9, digging module 8 is hinged to push module 11. More specifically, digging module 8 (FIG. 10) is hinged to push module 11 about a substantially vertical axis A1. The position of digging module 8 relative to push module 11 is, in certain embodiments, controlled by an actuator 14, to direct device 1 horizontally.

Figure 11:
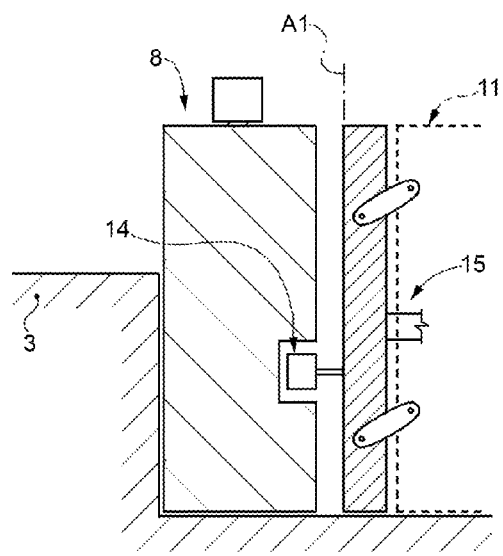
FIG. 11 shows a partly sectioned side view, with parts removed for clarity, of a variation of the device according to the present disclosure.

In the FIG. 11 variation, digging module 8 is connected to push module 11 in selectively adjustable manner in a substantially vertical direction using at least one further actuator 15.

Figure 8:
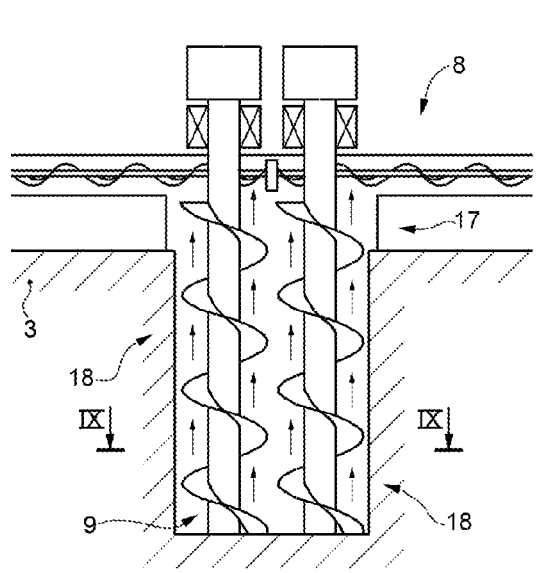
FIG. 8 shows a partly sectioned elevation, with parts removed for clarity, of the digging module of the device according to the present disclosure.
Figure 10:
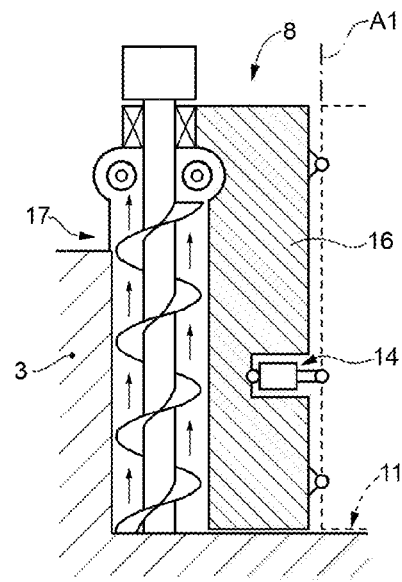
FIG. 10 shows a partly sectioned side view, with parts removed for clarity, of the FIG. 8 digging module.

With reference to FIGS. 8 to 10, digging module 8 comprises a frame 16; and a powered-screw assembly 17 configured to break up, excavate and remove the mass of bed 3 of body of water 4. As shown in FIG. 8, trench 9 has a substantially rectangular cross section, (i.e., has two opposite, parallel, substantially vertical side faces 18).

Figure 12:
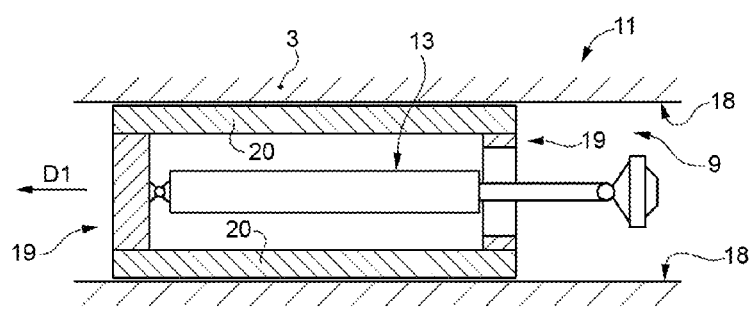
FIG. 12 shows a partly sectioned plan view, with parts removed for clarity, of the push module of the device according to the present disclosure.
Figure 13:
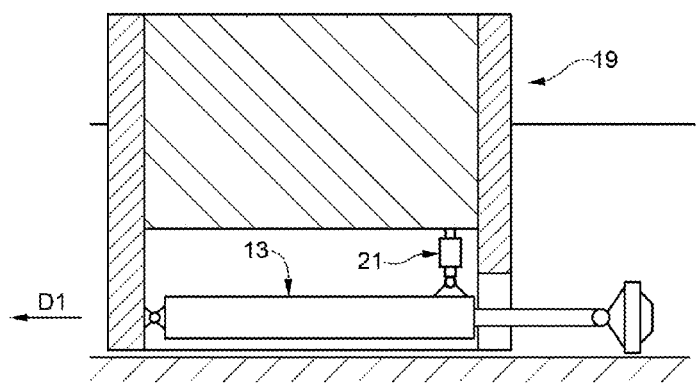
FIG. 13 shows a partly sectioned side view, with parts removed for clarity, of the FIG. 12 push module.

With reference to FIGS. 12 and 13, push module 11 comprises a frame 19 configured to support pusher 13 and the side faces 18 of trench 9. In the example shown, frame 19 is parallelepiped-shaped, and is open at the bottom and at least partly at the rear to enable pusher 13 to extend outwards of frame 19. More specifically, frame 19 has two opposite, parallel lateral walls 20 configured to support side faces 18 of trench 9.

With reference to FIG. 13, pusher 13 is substantially defined by a linear actuator, and is adjustable selectively with respect to frame 19. More specifically, pusher 13 is hinged at one end to frame 19, and is also connected to frame 19 by a further actuator 21 configured to adjust the longitudinal tilt of pusher 13. This way of assembling pusher 13 enables correction of any misalignment between pusher 13 and the sections 5 supported by manipulator 12 (FIG. 3).

With reference to FIG. 14, manipulating module 10 comprises a frame 22, in turn substantially comprising two lateral walls 23, the outer faces of which support side faces 18 (FIG. 8) of trench 9, and the inner faces of which support manipulator 12. In certain embodiments, push module 11 and manipulating module 10 are integral with each other. So, each lateral wall 23 is integral with a respective lateral wall 20. In certain embodiments, walls 20 and 23 are defined by a single panel.

Unlike frame 19, frame 22 is also open at the top to enable insertion of conduit sections 5 between lateral walls 23. In certain embodiments, manipulating module 10 may be connected to a storage module (not shown in the drawings) containing a designated quantity or number of sections 5 (e.g., three sections).

In certain embodiments, manipulator 12 comprises two holders 24 configured to house a conduit section 5, and to move between a lowered position and a raised position. Each holder 24 is fitted slidably to a respective wall 23, and is connected to a respective actuator 25.

With reference to FIGS. 15 and 16, device 1 comprises a stabilizer 26 configured to rest on bed 3 of body of water 4, and in certain embodiments, on adjustable supports 27.

More specifically, stabilizer 26 comprises a frame 28 connected to the top of manipulating module 10 and push module 11; and two supports 27 located on opposite sides of push module 11 and manipulating module 10, and hinged to frame 28 by an articulated parallelogram system. The distance between each support 27 and frame 28 is adjustable independently of the other. In the example shown, each support 27 is operated by a pair of actuators 29.

In a variation not shown in the drawings, each support 27 is operated by one actuator located directly between support 27 and frame 28.

Figure 17:
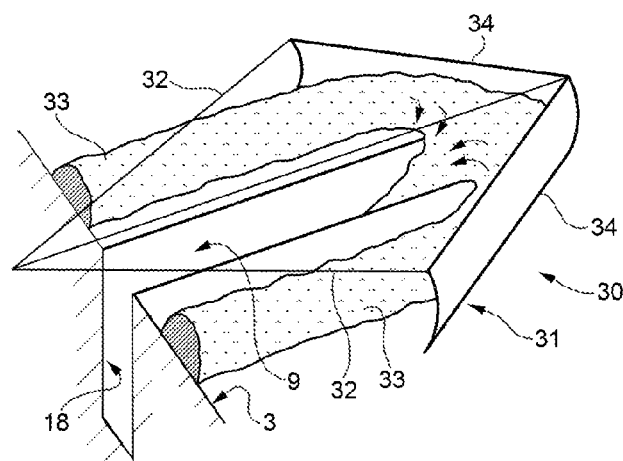
FIG. 17 shows a plan view, with parts removed for clarity, of a trench backfill module.

With reference to FIG. 17, device 1 comprises a further module—in the example shown, a backfill module 30 downstream from manipulating module 10 (FIG. 1).

Backfill module 30 is towed by the rest of device 1, and comprises a shovel 31 configured to rest on bed 3 of body of water 4 and intercept the mass of bed 3 removed by digging module 8; and tow bars 32.

Digging module 8 (FIG. 8) forms two continuous, elongated piles 33 of excavated bed 3 on opposite sides of trench 9.

Shovel 31 is configured to intercept both piles 33 and to guide the mass in piles 33 into trench 9 as device 1 moves forward.

In this example embodiment, shovel 31 has two walls 34 sloping with respect to each other and each configured to intercept a respective pile 33.

Figure 18:
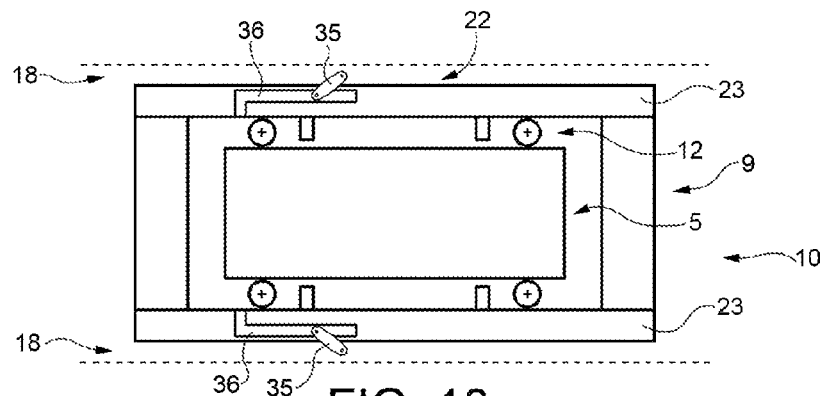
FIG. 18 shows a partly sectioned plan view, with parts removed for clarity, of a variation of the device according to the present disclosure.

As shown in FIG. 18, in a variation of the present disclosure, lateral walls 23 comprise movable walls 35 located on opposite sides, and which can be operated selectively to adjust the pressure of each against side face 18 of trench 9 and control the lateral tilt of device 1. Each movable wall 35 is operated by a respective actuator 36.

Figure 19:
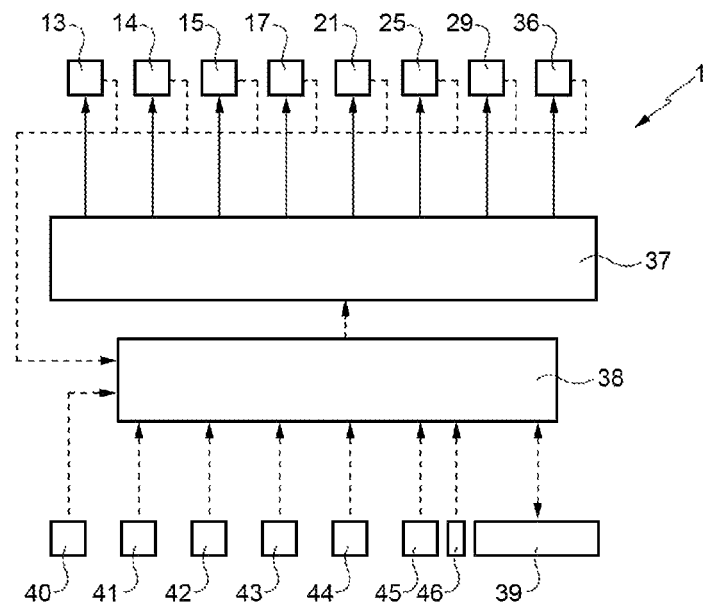
FIG. 19 shows a schematic, with parts removed for clarity, of the control system of the device according to the present disclosure.

With reference to FIG. 19, device 1 comprises a power unit 37; a control unit 38; and a control console 39 configured to manually operate device 1.

Power unit 37 powers actuators 14, 15, 21, 25, 29 and 36, pusher 13, and screw assembly 17, all of which are, in certain embodiments, configured to generate and transmit respective operating-state signals to control unit 38, which in turn controls power unit 37. The device is thus closed-cycle-controlled. In certain embodiments, power unit 37 is hydraulic, but may be electric or hydraulic and electric combined.

Device 1 can be controlled manually from console 39, or automatically on the basis of assigned and detected parameters, or semi-automatically.

In the example shown, device 1 comprises a steering sensor 40, a depth-change sensor 41, a depth sensor 42, a device longitudinal tilt sensor 43, a device lateral tilt sensor 44, a pusher longitudinal tilt sensor 45, and a conduit section position sensor 46.

In actual use, as shown in FIGS. 1 to 6, device 1 digs a trench 9, partly engages trench 9, joins conduit sections 5 inside trench 9 and device 1, and moves in travelling direction D1.

As pushed extends, pusher 13 fits conduit section 5 to the section 5 already fitted to conduit 2, and generates thrust to move device 1 in direction D1.

Conduit sections 5 are fed through an opening in the top of device 1 to manipulator 12 located inside device 1 and configured to grip and align each conduit section 5 with a designated or given reference point. More specifically, conduit section 5 is aligned with the previously laid portion of conduit 2.

As device 1 moves forward, device 1 supports side faces 18 of trench 9, and defines a space in which to manipulate and join conduit sections 5.

Once conduit section 5 is aligned by manipulator 12 with a designated or given reference point, pusher 13 is activated to engage conduit section 5; to push conduit section 5, in the opposite direction to travelling direction D1, against a member outside device 1, so as to fit conduit section 5 tightly to the outside member; and to move device 1 once the conduit section is fitted.

As regards control of device 1, the greater the quantity or number of operating parameters of device 1 that are monitored, the faster and more accurately the digging work and assembly of conduit 2 can be carried out.

Control unit 38 of device 1 is configured to acquire at least one, and, in certain embodiments, all, of the following signals:
 a signal related to the steering angle of the device, or rather between two articulated portions of the device;
 a signal related to the variation in the depth of the two articulated portions of the device;
 a signal related to the depth of the device;
 a signal related to the longitudinal tilt of the device;
 a signal related to the lateral tilt of the device;
 a signal related to the longitudinal tilt of pusher 13; and
 a signal related to the position of conduit section 5 with respect to a reference point.

Clearly, changes may be made to the embodiment described of the present disclosure without, however, departing from the protective scope claimed. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A conduit burying device comprising:
 a digging module;
 a manipulating module;
 a push module connected to the digging module and the manipulating module, said push module including a frame and a pusher fitted to the frame, wherein regardless of any position of the pusher of the push module, the frame of said push module and the manipulating module are arranged successively in the trench in a direction opposite to a direction of travel;
 a plurality of movable lateral walls located on opposite sides, each of said movable lateral walls selectively operated to adjust a pressure against a side face of a trench; and
 a control unit operably connected to the digging module, the manipulating module and the push module and programmed to:
  cause the digging module to dig the trench in a bed of a body of water;
  cause the manipulating module to feed a conduit section into the trench; and
  cause the push module to simultaneously:
   (a) join, inside the trench, the conduit section with another conduit section, and
   (b) move the push module, the manipulating module and the digging module in the direction of travel.

2. The conduit burying device of claim 1, wherein the digging module, the push module and the manipulating module are arranged successively in the direction opposite to the direction of travel.

3. The conduit burying device of claim 1, wherein the control unit is programmed to cause the digging module to break up and remove a mass of the bed of the body of water having a designated cross section substantially the same size as: (i) a cross section of a portion of the manipulating module inside the trench, and (ii) a cross section of a portion of the push module inside the trench.

4. The conduit burying device of claim 1, wherein the manipulating module includes a manipulator that grips the conduit section and aligns the conduit section with a designated reference.

5. The conduit burying device of claim 4, wherein the manipulating module includes a frame having two lateral walls that support side faces of the trench.

6. The conduit burying device of claim 5, wherein the manipulator is supported by the two lateral walls.

7. The conduit burying device of claim 1, wherein the control unit is programmed to cause the pusher to:
 engage the conduit section, and
 push the conduit section, in the direction opposite to the direction of travel, against a member outside the conduit burying device to:
  fit the conduit section to the member outside of the conduit burying device, and
  move the push module in the direction of travel.

8. The conduit burying device of claim 7, wherein a longitudinal tilt of the pusher is selectively adjustable.

9. The conduit burying device of claim 8, wherein an actuator connected to the frame and the pusher selectively adjusts the longitudinal tilt of the pusher.

10. The conduit burying device of claim 7, wherein the frame includes two lateral walls that support side faces of the trench.

11. The conduit burying device of claim 1, wherein the control unit is programmed to cause the pusher to:
    engage the joined conduit sections, and
    push the joined conduit sections, in the direction opposite to the direction of travel, against a member outside the conduit burying device to:
        fit the joined conduit sections to the member outside of the conduit burying device, and
        move the push module in the direction of travel.

12. The conduit burying device of claim 11, wherein a longitudinal tilt of the pusher is selectively adjustable.

13. The conduit burying device of claim 12, wherein an actuator connected to the frame and the pusher selectively adjusts the longitudinal tilt of the pusher.

14. The conduit burying device of claim 11, wherein the frame includes two lateral walls that support side faces of the trench.

15. The conduit burying device of claim 1, wherein the manipulating module and push module are rigidly connected to each other.

16. The conduit burying device of claim 1, wherein the digging module and push module are articulated about a steering axis.

17. The conduit burying device of claim 16, which includes at least one actuator that controls a position of the digging module with respect to the push module about the steering axis.

18. The conduit burying device of claim 1, wherein the digging module is selectively adjustably connected to the push module in a substantially vertical direction using at least one actuator.

19. The conduit burying device of claim 1, which includes a backfill module.

20. The conduit burying device of claim 19, wherein the backfill module includes a shovel which extends on opposite sides of the trench, said shovel including two blades sloping with respect to the direction of travel.

21. A conduit burying device comprising:
    a digging module;
    a manipulating module;
    a push module connected to the digging module and the manipulating module, said push module including a frame and a pusher fitted to the frame, wherein regardless of any position of the pusher of the push module, the frame of said push module and the manipulating module are arranged successively in the trench in a direction opposite to a direction of travel;
    a stabilizer adjustably resting on a bed of a body of water, said stabilizer including:
        a frame rigidly connected to one of the push module and the manipulating module, and
        two supports located on opposite sides of the push module, and selectively movably connected to the frame of the stabilizer independently of each other; and
    a control unit operably connected to the digging module, the manipulating module, and the push module and programmed to:
        cause the digging module to dig a trench in the bed of the body of water;
        cause the manipulating module to feed a conduit section into the trench; and
        cause the push module to simultaneously:
            (a) join, inside the trench, the conduit section with another conduit section, and
            (b) move the push module, the manipulating module and the digging module in the direction of travel.

22. A conduit burying device comprising:
    a digging module;
    a manipulating module;
    a push module connected to the digging module and the manipulating module, said push module including a frame and a pusher fitted to the frame, wherein:
        the digging module is selectively adjustably connected to the push module in a substantially vertical direction using at least one actuator, and
        regardless of any position of the pusher of the push module, the frame of said push module and the manipulating module are arranged successively in the trench in a direction opposite to a direction of travel;
    a stabilizer adjustably resting on a bed of a body of water, said stabilizer including:
        a frame rigidly connected to one of the push module and the manipulating module, and
        two supports located on opposite sides of the push module, and selectively movably connected to the frame of the stabilizer independently of each other; and
    a control unit operably connected to the digging module, the manipulating module, and the push module and programmed to:
        cause the digging module to dig a trench in the bed of the body of water;
        cause the manipulating module to feed a conduit section into the trench; and
        cause the push module to simultaneously:
            (a) join, inside the trench, the conduit section with another conduit section, and
            (b) move the push module, the manipulating module and the digging module in the direction of travel.

23. A conduit burying device comprising:
    a digging module;
    a manipulating module;
    a push module connected to the digging module and the manipulating module, said push module including a frame and a pusher fitted to the frame, wherein:
        the digging module is selectively adjustably connected to the push module in a substantially vertical direction using at least one actuator, and
        regardless of any position of the pusher of the push module, the frame of said push module and the manipulating module are arranged successively in the trench in a direction opposite to a direction of travel;
    a stabilizer adjustably resting on a bed of a body of water, said stabilizer including:
        a frame rigidly connected to one of the push module and the manipulating module, and
        two supports located on opposite sides of the push module, and selectively movably connected to the frame of the stabilizer independently of each other;

a plurality of movable lateral walls located on opposite sides, each of said movable lateral walls selectively operated to adjust a pressure against a side face of a trench; and a control unit operably connected to the digging module, the manipulating module, and the push module and programmed to:
  cause the digging module to dig the trench in the bed of the body of water;
  cause the manipulating module to feed a conduit section into the trench; and
  cause the push module to simultaneously:
    (a) join, inside the trench, the conduit section with another conduit section, and
    (b) move the push module, the manipulating module and the digging module in the direction of travel.

\* \* \* \* \*